July 13, 1948. R. E. FARMER 2,445,263
STEERING GEAR
Filed July 17, 1946 2 Sheets-Sheet 1

ROY E. FARMER
INVENTOR.

ROY E. FARMER
INVENTOR.

Patented July 13, 1948

2,445,263

UNITED STATES PATENT OFFICE 2,445,263

STEERING GEAR

Roy E. Farmer, Detroit, Mich., assignor to Ford Motor Company, Dearborn, Mich., a corporation of Delaware Application July 17, 1946, Serial No. 684,365

1 Claim. (Cl. 74—500)

This application is concerned with a vehicular steering gear and more particularly with a steering gear specifically adapted to agricutural tractors and similar heavy duty apparatus in which steering is accomplished by a steering wheel which is mounted in a vertical plane through the transverse midsection of the tractor. Heretofore tractors have been steered through this type of centrally located gear with the output from the steering gear taken off on either or both sides of the gear box. Where the output has been taken off only on one side, the remainder of the steering mechanism has closely followed automotive practice and made use of the conventional tie rod for connecting the two front wheels. Where the output has been taken off from both sides of the gear box through two individual steering arms, a separate drag link has been provided for each front wheel. It is this latter type of double take off steering gear with which this application is concerned.

In this double take off type of steering gear it has been heretofore deemed necessary, in order to maintain proper steering symmetry, to have the two take off shafts leading from the gear box coaxial. The use of a solid shaft extending through the gear box is precluded since the rotation of the left take off shaft is of necessity opposite in direction to that of the right hand take off shaft. In practice these requirements that the two take off shafts be coaxial and revolve in opposite directions, have led to some rather bulky, complicated and expensive structures. Applicant has discovered that proper steering geometry can be maintaianed even though the two take off shafts do not present coincident axes, and has invented a simple, rugged and inexpensive steering gear in which this discovery can be utilized. Applicant's preferred structure is composed largely of parts long standard in automotive steering apparatus.

Accordingly it is an object of this invention to provide a vehicular steering gear having two take offs whose axes are non-coincident.

It is a further object of this invention to provide a tractor steering gear having two eccentric take offs and which utilizes to a large degree parts standard in automotive practice.

With these and other objects in view, the invention consists in the arrangement, construction and combination of the various parts of the improved structure as described in the specification, claimed in the claim and illustrated in the accompanying drawings, in which:

Figure 1:
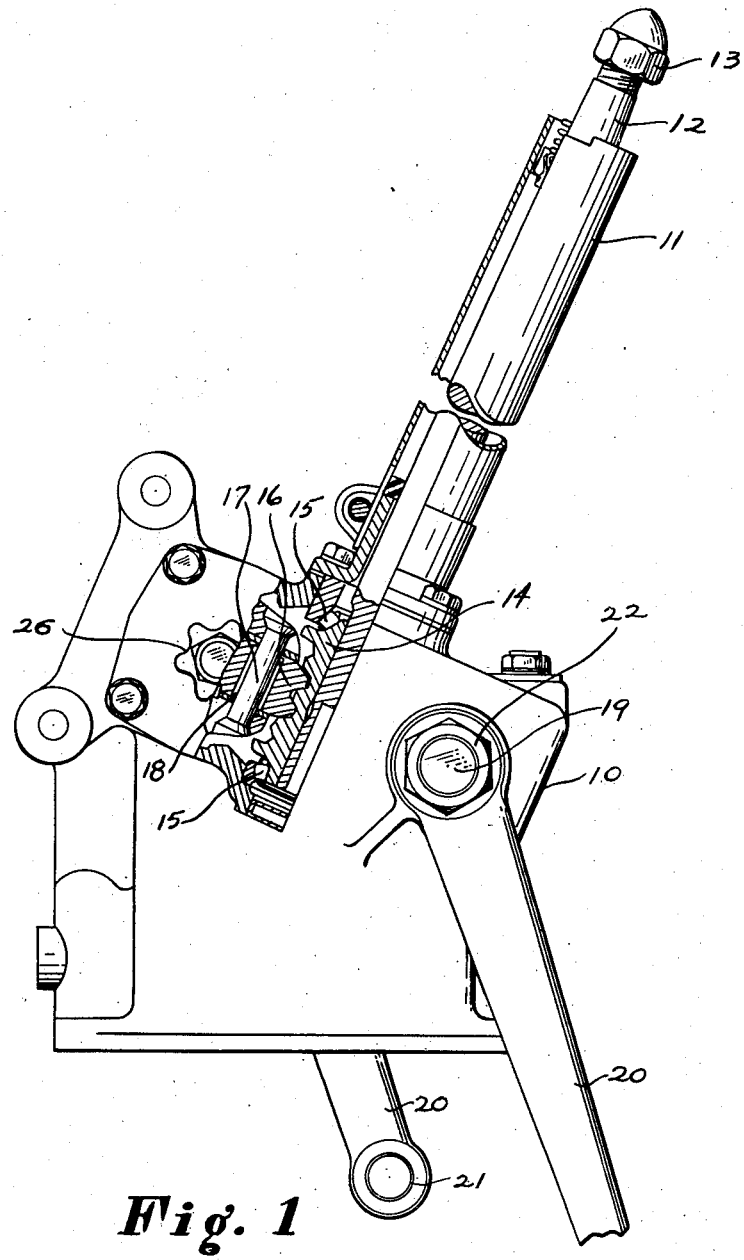
Figure 1 is an elevation of the steering gear partially in section.
Figure 2:
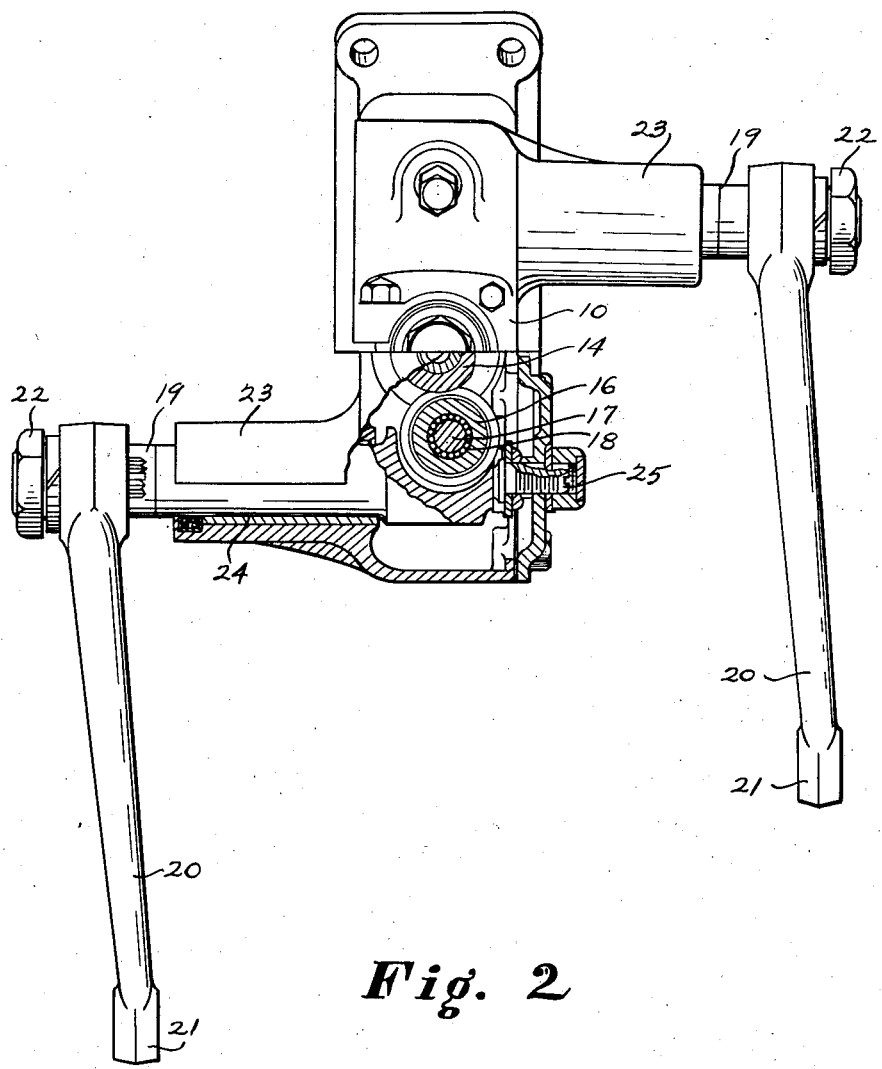
Figure 2 is a plan view of the steering gear partially in section.

In Figure 1 the steering gear case is indicated generally as 10. Steering column 11 is mounted upon gear case 10 and encloses steering shaft 12. Steering shaft 12 terminates at its upper end in threads which accommodate nut 13 by which a steering wheel is secured to the shaft. Hour glass worm gear 14 is rigidly secured to the lower end of steering column shaft 12. This hour glass worm gear is supported in anti-friction bearings 15. The periphery of hour glass worm gear 14 engages rotary follower 16. This rotary follower is journaled on shaft 17 through needle bearing 18. The ends of shaft 17 are trunnioned in supports mounted on offtake shaft 19. There are, of course, two off take shafts 19 in applicant's steering gear. In Figure 1 only that off take shaft to the right of steering shaft 12 is shown. Attention is directed to Figure 2 for a clear teaching of the relationship of rotary follower 16 and off take shaft 19. Steering arms 20 which terminate in eyes 21 are splined to the outer ends of offtake shafts 19. These offtake shafts are supported intermediate their ends in bushings 24 mounted in bosses 23 (Figure 2). This structure is shown in the sectioned portion of Figure 1 to the left of the axis of steering shaft 12. A similar mechanism is provided directly opposite that shown and operates the right hand offtake shaft 19.

Any rotation of the steering wheel causes a corresponding rotation of hour glass worm gear 14. This turning of hour glass worm gear 14 causes rotary follower 16 to rotate about the axis of shaft 17 on needle bearings 18 and also to revolve about the axis of offtake shaft 19 since shaft 17 is trunnioned on the end of offtake shaft 19. This rotation about the axis of offtake shaft 19 is transmitted to the drag links (not shown) through steering arms 20 and eyes 21.

In Figure 2, a partial section has been taken normal to the steering column and on a plane passing through the axes of both offtake shafts 19. This figure shows the intermeshing of hour glass worm gear 14 and rotary follower 16. This figure also illustrates adjusting screw 25. By means of this adjusting screw, shaft 19 is movable axially to compensate for wear of the rotary follower 16 and hour glass worm gear 14. This adjusting screw 25 is secured against accidental rotation by star washer 26.

The steering gear shown is illustrated in the straight ahead or neutral position. In this position the axes of the two shafts 17 upon which are mounted rotary followers 16 and the axis of steering shaft 12 are parallel and approximately coplanar. The axes of offtake shafts 19 are parallel but of course are not coincident. In the form illustrated these offtake shafts 19 are displaced from each other both vertically and horizontally, although applicant's invention contemplates any displacement, either horizontal or vertical, or both combined. The use of non-coaxial shafts at this place permits the steering gear to be designed for maximum economy since the necessity of coaxial offtakes has been eliminated.

What is claimed is:

In a vehicular steering gear, a steering column shaft mounted obliquely to the vertical, an hour glass worm secured to the steering column shaft, a pair of offtake shafts, one of which is located ahead of and one of which is located behind the steering column shaft and whose axes are parallel and fall in a common plane normal to the steering column shaft, a pair of rotary followers rigidly mounted upon said offtake shafts and operatively connecting the worm gear and offtake shafts, the axes of said rotary followers falling outside that plane normal to the offtake shafts and bisecting the hour glass worm a small but significant distance and adjusting means to move each of said rotary followers parallel to the axes of the offtake shafts, said adjusting means being located on opposite sides of the gear case.

ROY E. FARMER.

REFERENCES CITED

The following references are of record in the file of this patent:

UNITED STATES PATENTS

| Number | Name | Date |
|---|---|---|
| 1,723,537 | Wright | Aug. 6, 1929 |
| 1,882,848 | Marles | Oct. 18, 1932 |
| 2,075,745 | Murden | Mar. 30, 1937 |
| 2,366,122 | Merce | Dec. 26, 1944 |